(12) United States Patent
Weyhrauch et al.

(10) Patent No.: US 7,358,689 B1
(45) Date of Patent: Apr. 15, 2008

(54) PHASE-CONTROL POWER CONTROLLER FOR CONVERTING A LINE VOLTAGE TO A RMS LOAD VOLTAGE

(75) Inventors: Ernest C. Weyhrauch, Richmond, KY (US); Matthew B. Ballenger, Lexington, KY (US); George B. Kendrick, Lexington, KY (US)

(73) Assignee: Osram Sylvania Inc., Danvers, MA (US)

( * ) Notice: Subject to any disclaimer, the term of this patent is extended or adjusted under 35 U.S.C. 154(b) by 81 days.

(21) Appl. No.: 11/526,384

(22) Filed: Sep. 25, 2006

(51) Int. Cl.
*H05B 37/02* (2006.01)

(52) U.S. Cl. .................. 315/308; 315/209 R; 315/246

(58) Field of Classification Search .................. 315/51, 315/56, 72, 194, 200 R, 209 R, 224, 246–247, 315/291, 307–308, 360, DIG. 4; 323/212, 323/217

See application file for complete search history.

(56) References Cited

U.S. PATENT DOCUMENTS

| | | | |
|---|---|---|---|
| 2,012,825 A | 8/1935 | Millner et al. ............... 75/17 |
| 3,275,922 A | 9/1966 | Meyer et al. ............... 321/15 |
| 3,609,402 A | 9/1971 | Ferro ............... 307/252 M |
| 3,869,631 A | 3/1975 | Anderson et al. ........... 313/217 |
| 4,224,563 A | 9/1980 | Hardy ............... 323/225 |
| 4,331,914 A | 5/1982 | Huber ............... 323/324 |
| 4,500,813 A | 2/1985 | Weedall ............... 315/276 |
| 4,547,704 A | 10/1985 | Brinn et al. ............... 315/71 |
| 4,645,982 A | 2/1987 | Takayanagi ............... 315/307 |
| 4,922,155 A | 5/1990 | Morris et al. ............... 315/205 |
| 4,988,921 A | 1/1991 | Ratner et al. ............... 315/159 |
| 5,519,311 A | 5/1996 | Widmayer ............... 232/319 |
| 5,585,697 A * | 12/1996 | Cote et al. ............... 315/157 |
| 6,208,090 B1 | 3/2001 | Skilskyj et al. ............... 315/360 |
| 6,285,119 B1 | 9/2001 | Sundhar ............... 313/318.04 |
| 6,445,133 B1 | 9/2002 | Lin et al. ............... 315/57 |
| 6,600,255 B1 | 7/2003 | Kai et al. ............... 313/271 |
| 6,727,665 B2 | 4/2004 | Yao ............... 315/247 |
| 7,030,567 B2 * | 4/2006 | Ballenger et al. ...... 315/209 SC |
| 7,166,964 B2 * | 1/2007 | Weyhrauch et al. ........... 315/51 |
| 7,170,231 B2 * | 1/2007 | Weyhrauch et al. ........... 315/51 |
| 7,170,236 B2 * | 1/2007 | Weyhrauch et al. ......... 315/308 |
| 2002/0047608 A1 | 4/2002 | Takahashi et al. ........... 315/224 |
| 2004/0085049 A1 | 5/2004 | Orozco ............... 323/235 |
| 2005/0146293 A1 * | 7/2005 | Ballenger et al. ........... 315/308 |
| 2005/0275354 A1 | 12/2005 | Hausman, Jr. et al. ...... 315/291 |
| 2007/0247084 A1 * | 10/2007 | Zhao ............... 315/291 |

* cited by examiner

*Primary Examiner*—Thuy V. Tran
*Assistant Examiner*—Tung X Le
(74) *Attorney, Agent, or Firm*—Carlo S. Bessone (57) ABSTRACT

A phase-control power controller converts a line voltage to an RMS load voltage and includes a phase-control clipping circuit that clips a load voltage to provide the RMS load voltage. The power controller may be in a base of a lamp and connected to a lamp terminal. The phase-clipping circuit establishes a phase conduction angle that determines the RMS load voltage for the lamp and includes a transistor switch and a microcontroller that operates the transistor switch, where ON/OFF periods of the transistor switch define the phase conduction angle. The microcontroller senses a load voltage at the lamp terminal, compares the sensed load voltage to a reference RMS voltage, and adjusts the ON/OFF periods of the transistor switch in response to the comparison to cause the load voltage to approach the reference RMS voltage. The circuit may be used for reverse, forward, or forward/reverse hybrid phase clipping.

8 Claims, 11 Drawing Sheets

PHASE-CONTROL POWER CONTROLLER FOR CONVERTING A LINE VOLTAGE TO A RMS LOAD VOLTAGE

BACKGROUND OF THE INVENTION

The present invention is directed to a power controller that supplies a specified power to a load, and more particularly to a voltage converter for a lamp that converts line voltage to a voltage suitable for lamp operation.

Some loads, such as lamps, operate at a voltage lower than a line (or mains) voltage of, for example, 120V or 220V, and for such loads a voltage converter (or power controller) that converts line voltage to a lower operating voltage must be provided. The power supplied to the load may be controlled with a phase-control clipping circuit that typically includes an RC circuit. Moreover, some loads operate most efficiently when the power is constant, or substantially so. However, line voltage variations are magnified by these phase-control clipping circuits due to their inherent properties (as will be explained below) and the phase-control clipping circuit is desirably modified to provide a more nearly constant RMS load voltage.

A simple four-component RC phase-control clipping circuit demonstrates a problem of conventional phase-control clipping circuits. The phase-controlled clipping circuit shown in FIG. 1 has a capacitor 22, a diac 24, a triac 26 that is triggered by the diac 24, and resistor 28. The resistor 28 may be a potentiometer that sets a resistance in the circuit to control a phase at which the triac 26 fires.

Figure 1:
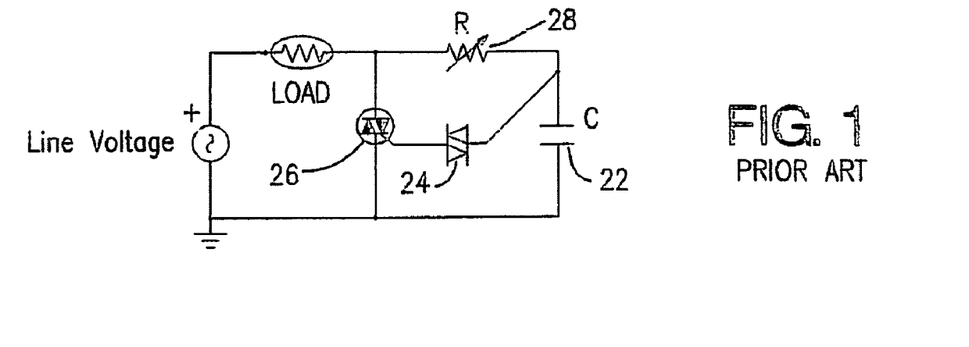
FIG. 1 is a schematic circuit diagram of a phase-controlled clipping circuit of the prior art.
Figure 2:
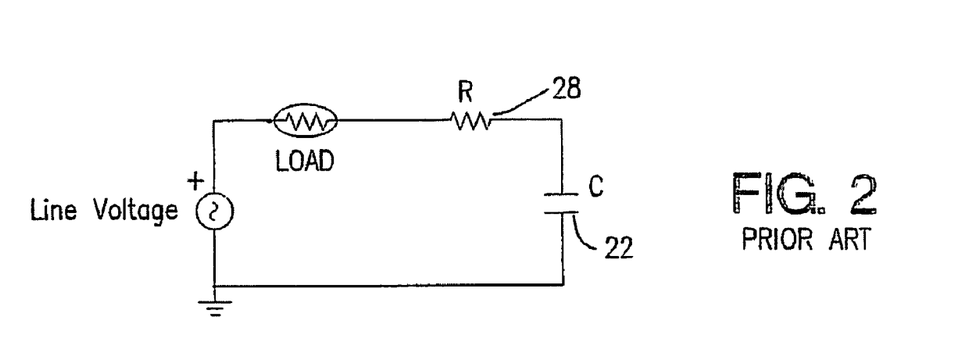
FIG. 2 is a schematic circuit diagram of the phase-controlled dimming circuit of FIG. 1 showing an effective state in which the triac is not yet triggered.

In operation, a clipping circuit such as shown in FIG. 1 has two states. In the first state the diac 24 and triac 26 operate in the cutoff region where virtually no current flows. Since the diac and triac function as open circuits in this state, the result is an RC series network such as illustrated in FIG. 2. Due to the nature of such an RC series network, the voltage across the capacitor 22 leads the line voltage by a phase angle that is determined by the resistance and capacitance in the RC series network. The magnitude of the capacitor voltage $V_C$ is also dependent on these values.

Figure 3:
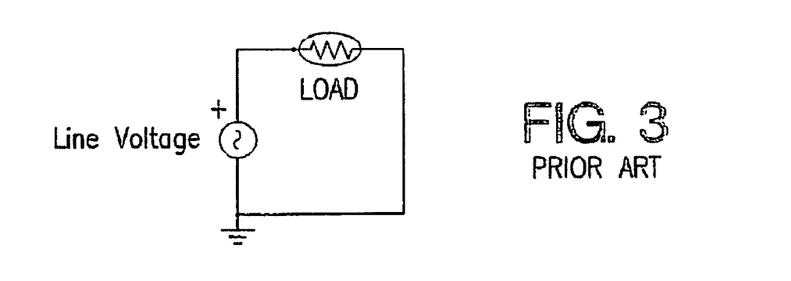
FIG. 3 is a schematic circuit diagram of the phase-controlled dimming circuit of FIG. 1 showing an effective state in which the triac has been triggered.

The voltage across the diac 24 is analogous to the voltage drop across the capacitor 22 and thus the diac will fire once breakover voltage $V_{BO}$ is achieved across the capacitor. The triac 26 fires when the diac 24 fires. Once the diac has triggered the triac, the triac will continue to operate in saturation until the diac voltage approaches zero. That is, the triac will continue to conduct until the line voltage nears zero crossing. The virtual short circuit provided by the triac becomes the second state of the clipping circuit as illustrated in FIG. 3.

Figure 4:
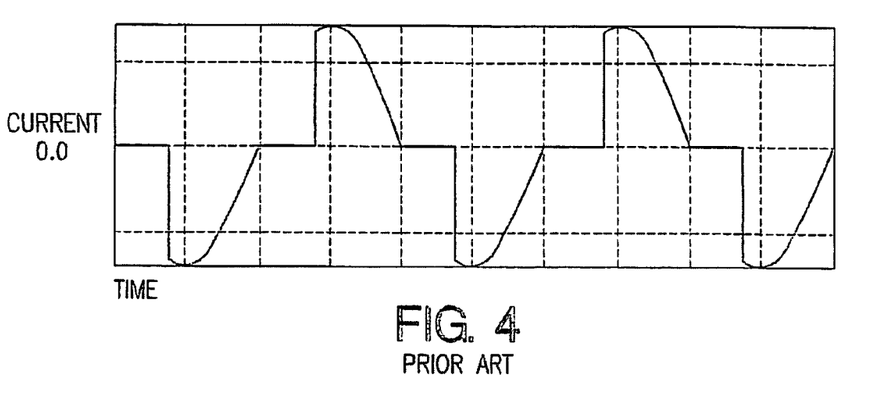
FIG. 4 is a graph illustrating current clipping in the phase-controlled dimming circuit of FIG. 1.
Figure 5:
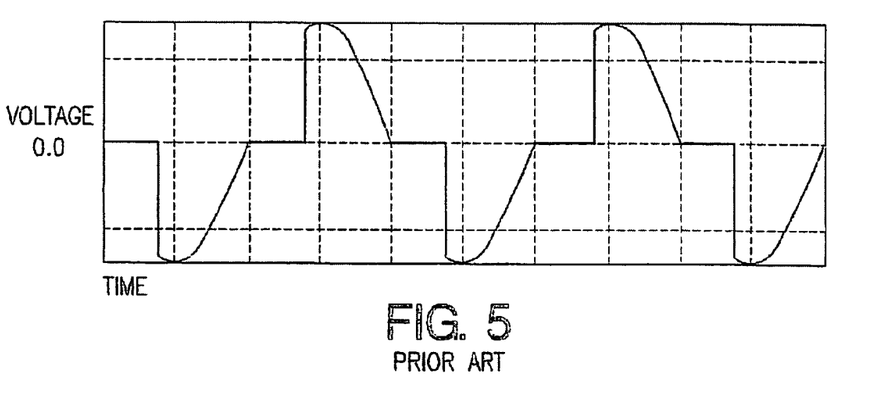
FIG. 5 is a graph illustrating voltage clipping in the phase-controlled dimming circuit of FIG. 1.

Triggering of the triac 26 in the clipping circuit is forward phase-controlled by the RC series network and the leading portion of the line voltage waveform is clipped until triggering occurs as illustrated in FIGS. 4-5. A load attached to the clipping circuit experiences this clipping in both voltage and current due to the relatively large resistance in the clipping circuit.

Accordingly, the RMS load voltage and current are determined by the resistance and capacitance values in the clipping circuit since the phase at which the clipping occurs is determined by the RC series network and since the RMS voltage and current depend on how much energy is removed by the clipping.

Figure 6:
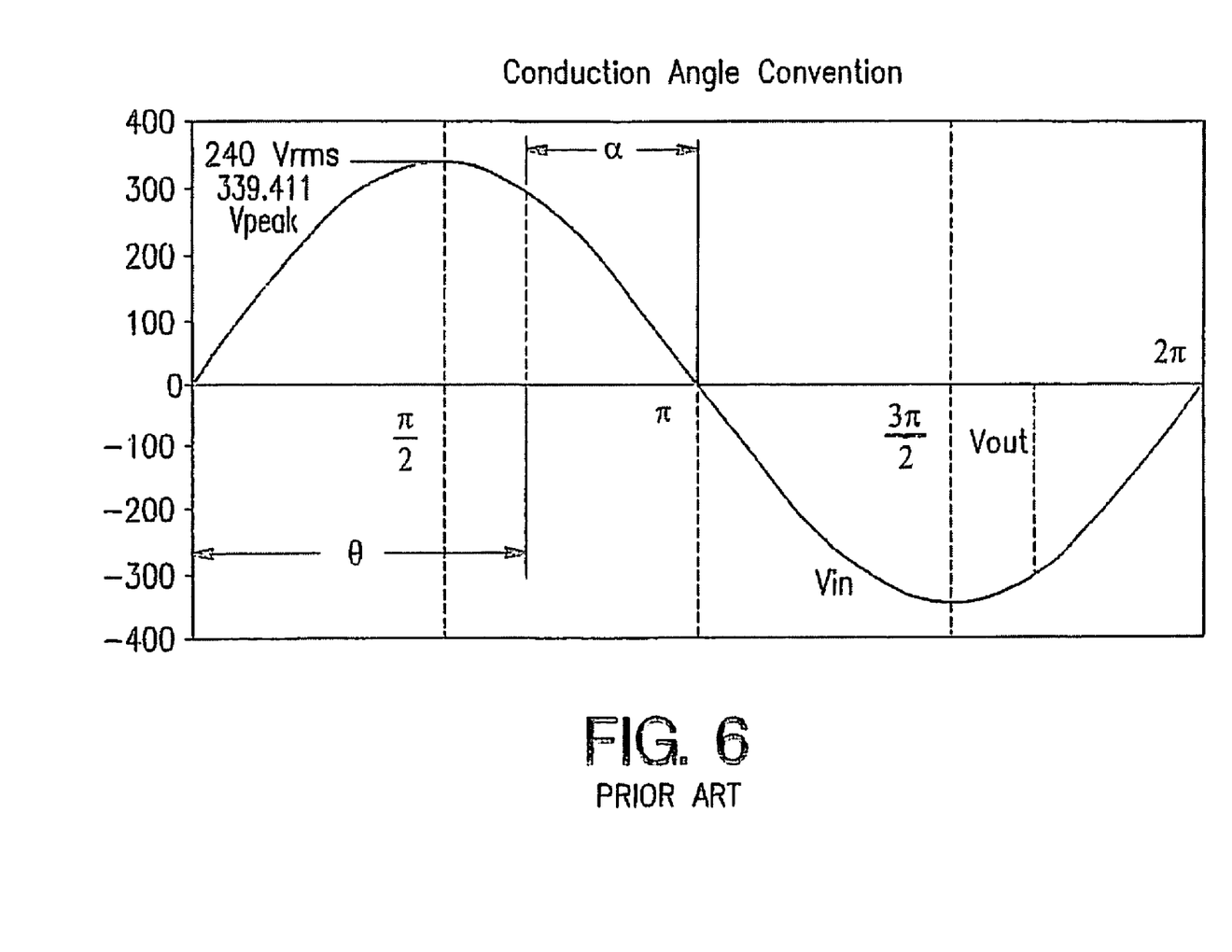
FIG. 6 is a graph depicting the conduction angle convention for forward phase clipping.

With reference to FIG. 6, clipping is characterized by a conduction angle $\alpha$ and a delay angle $\theta$. The conduction angle is the phase between the point on the load voltage/current waveforms where the triac begins conducting and the point on the load voltage/current waveform where the triac stops conducting. Conversely, the delay angle is the phase delay between the leading line voltage zero crossing and the point where the triac begins conducting.

Define $V_{irrms}$ as RMS line voltage, $V_{orms}$ as RMS load voltage, T as period, and $\omega$ as angular frequency (rad) with $\omega = 2\pi f$.

Line voltage may vary from location to location up to about 10% and this variation can cause a harmful variation in RMS load voltage in the load (e.g., a lamp). For example, if line voltage were above the standard for which the voltage conversion circuit was designed, the triac 26 may trigger early thereby increasing RMS load voltage. In a halogen incandescent lamp, it is particularly desirable to have an RMS load voltage that is nearly constant.

Changes in the line voltage are exaggerated at the load due to a variable conduction angle, and conduction angle is dependent on the rate at which the capacitor voltage reaches the breakover voltage of the diac. For fixed values of frequency, resistance and capacitance, the capacitor voltage phase angle ($\theta_C$) is a constant defined by $\theta_C = \arctan(-\omega RC)$. Therefore, the phase of $V_C$ is independent of the line voltage magnitude. However, the rate at which $V_C$ reaches $V_{BO}$ is a function of $V_{irrms}$ and is not independent of the line voltage magnitude.

Figure 7:
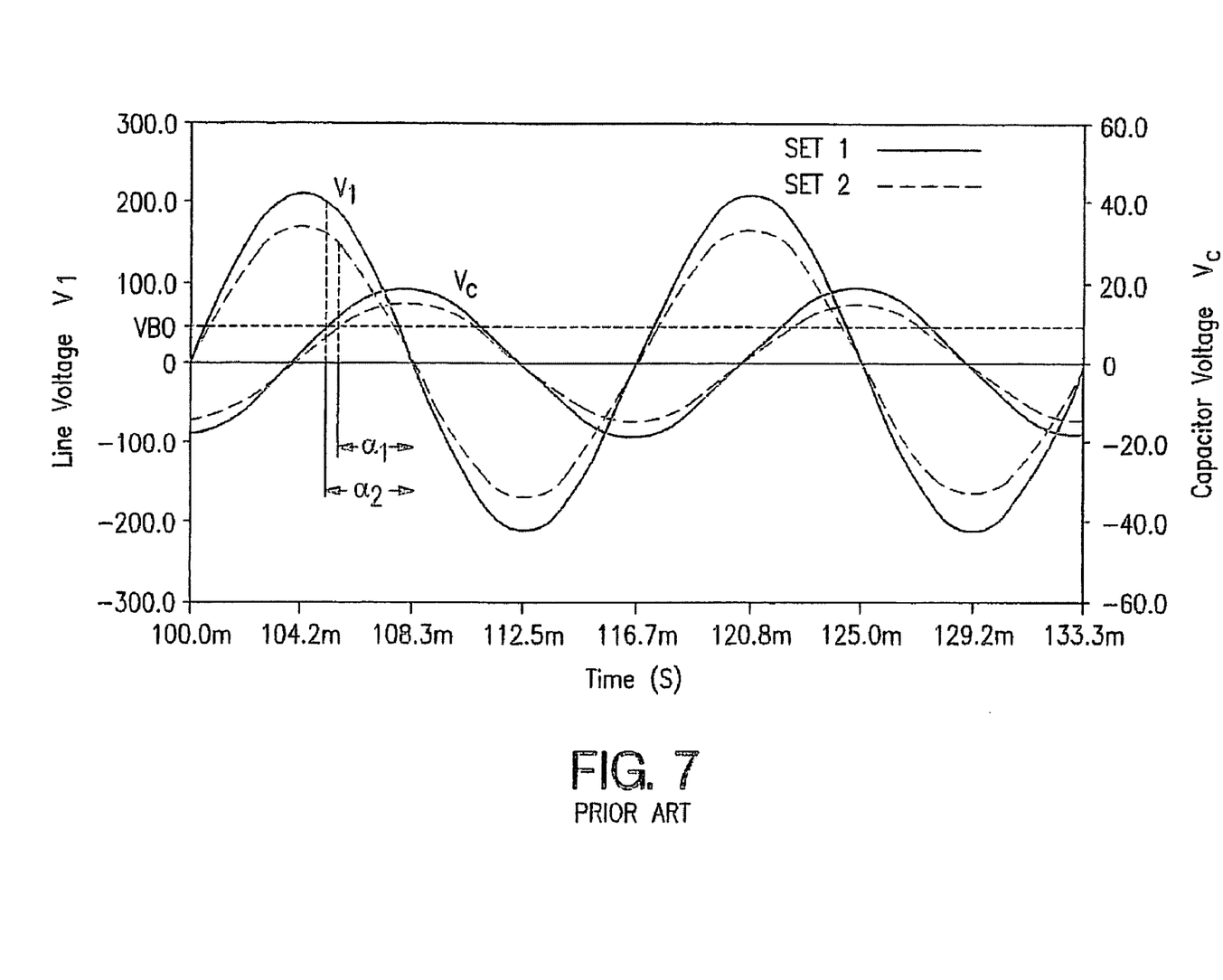
FIG. 7 is a graph showing how changes in the magnitude of the line voltage affect the rate at which capacitor voltage reaches the diac breakover voltage.

FIG. 7 depicts two possible sets of line voltage $V_i$ and capacitor voltage $V_C$. As may be seen therein, the rate at which $V_C$ reaches $V_{BO}$ varies depending on $V_{irrms}$. For RC phase-control clipping circuits the point at which $V_C = V_{BO}$ is of concern because this is the point at which diac/triac triggering occurs. As $V_{irrms}$ increases, $V_C$ reaches $V_{BO}$ earlier in the cycle leading to an increase in conduction angle ($\alpha_2 > \alpha_1$), and as $V_{irrms}$ decreases, $V_C$ reaches $V_{BO}$ later in the cycle leading to a decrease in conduction angle ($\alpha_2 < \alpha_1$).

Changes in $V_{irrms}$ leading to exaggerated or disproportional changes in $V_{orrms}$ are a direct result of the relationship between conduction angle and line voltage magnitude. As $V_{irrms}$ increases, $V_{orrms}$ increases due to both the increase in peak voltage and the increase in conduction angle, and as $V_{irrms}$ decreases, $V_{orrms}$ decreases due to both the decrease in peak voltage and the decrease in conduction angle. Thus, load voltage is influenced twice, once by a change in peak voltage and once by a change in conduction angle, resulting in unstable RMS load voltage conversion for the simple phase-control clipping circuit.

When the phase-control power controller is used in a voltage converter of a lamp, the voltage converter may be provided in a fixture to which the lamp is connected or within the lamp itself. U.S. Pat. No. 3,869,631 is an example of the latter, in which a diode is provided in the lamp base for clipping the line voltage to reduce RMS load voltage at the light emitting element. U.S. Pat. No. 6,445,133 is another example of the latter, in which transformer circuits are provided in the lamp base for reducing the load voltage at the light emitting element.

SUMMARY OF THE INVENTION

An object of the present invention is to provide a novel phase-control power controller that converts a line voltage to an RMS load voltage and uses a microcontroller to adjust the voltage conversion in response to variations in line voltage magnitude.

A further object is to provide a novel phase-control power controller with a phase-control clipping circuit that establishes a phase conduction angle that determines an RMS load voltage, where the phase-clipping circuit includes a transistor switch and a microcontroller that operates the transistor switch, where ON/OFF periods of the transistor switch define the phase conduction angle, and in which the microcontroller senses the load voltage and compares the sensed load voltage to a reference RMS voltage and adjusts the ON/OFF periods of the transistor switch in response to the comparison to cause the load voltage to approach the reference RMS voltage. The circuit may be used for reverse, forward, or forward/reverse hybrid phase clipping.

DESCRIPTION OF PREFERRED EMBODIMENTS

Figure 8:
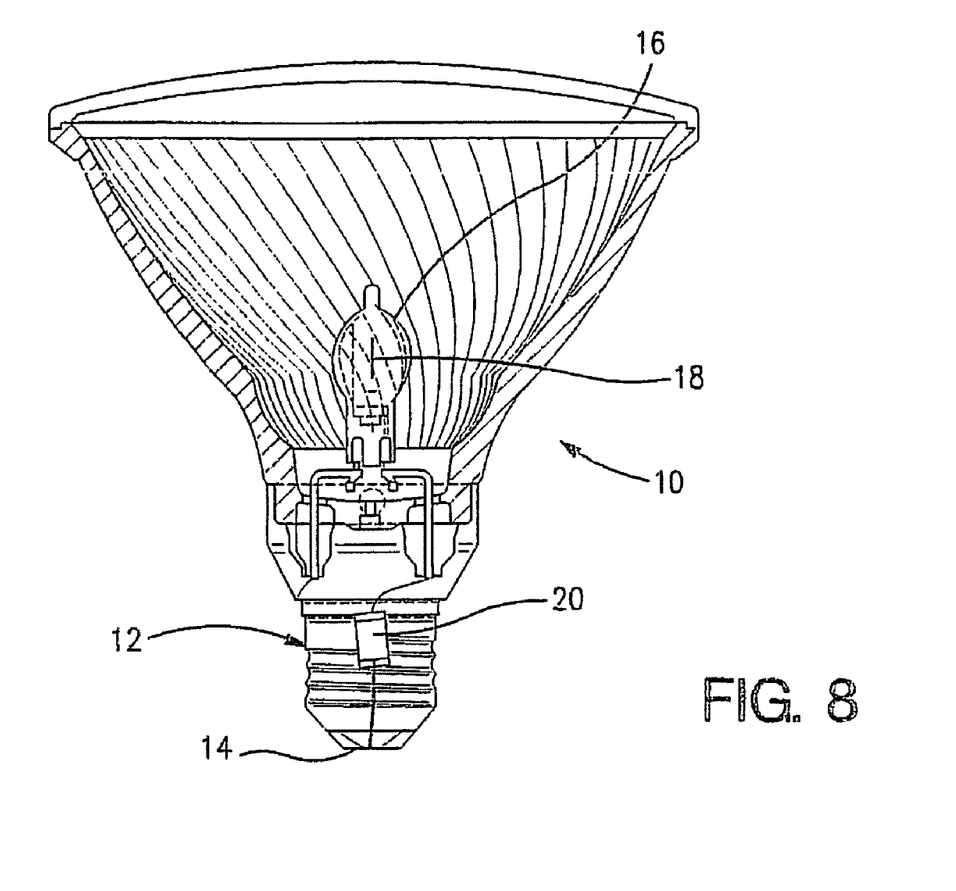
FIG. 8 is a partial cross section of an embodiment of a lamp of the present invention.

With reference to FIG. 8, a lamp 10 includes a base 12 with a lamp terminal 14 that is adapted to be connected to line (mains) voltage, a light-transmitting envelope 16 attached to the base 12 and housing a light emitting element 18 (an incandescent filament in the embodiment of FIG. 8), and a voltage conversion circuit 20 for converting a line voltage at the lamp terminal 14 to a lower operating voltage. The voltage conversion circuit 20 may be entirely within the base 12 and connected between the lamp terminal 14 and the light emitting element 18 (that is, the voltage conversion circuit 20 may be entirely within the part of the lamp that is arranged and adapted to fit into a lamp socket, such as shown in FIG. 8). The voltage conversion circuit 20 may be an integrated circuit in a suitable package as shown schematically in FIG. 8.

While FIG. 8 shows the voltage conversion circuit 20 in a parabolic aluminized reflector (PAR) halogen lamp, the voltage conversion circuit 20 may be used in any incandescent lamp when placed in series between the light emitting element (e.g., filament) and a connection (e.g., lamp terminal) to a line voltage. Further, the voltage conversion circuit described and claimed herein finds application other than in lamps and is not limited to lamps. It may also be used more generally where resistive or inductive loads (e.g., motor control) are present to convert an unregulated AC line or mains voltage at a particular frequency or in a particular frequency range to a regulated RMS load voltage of specified value.

Figure 9:
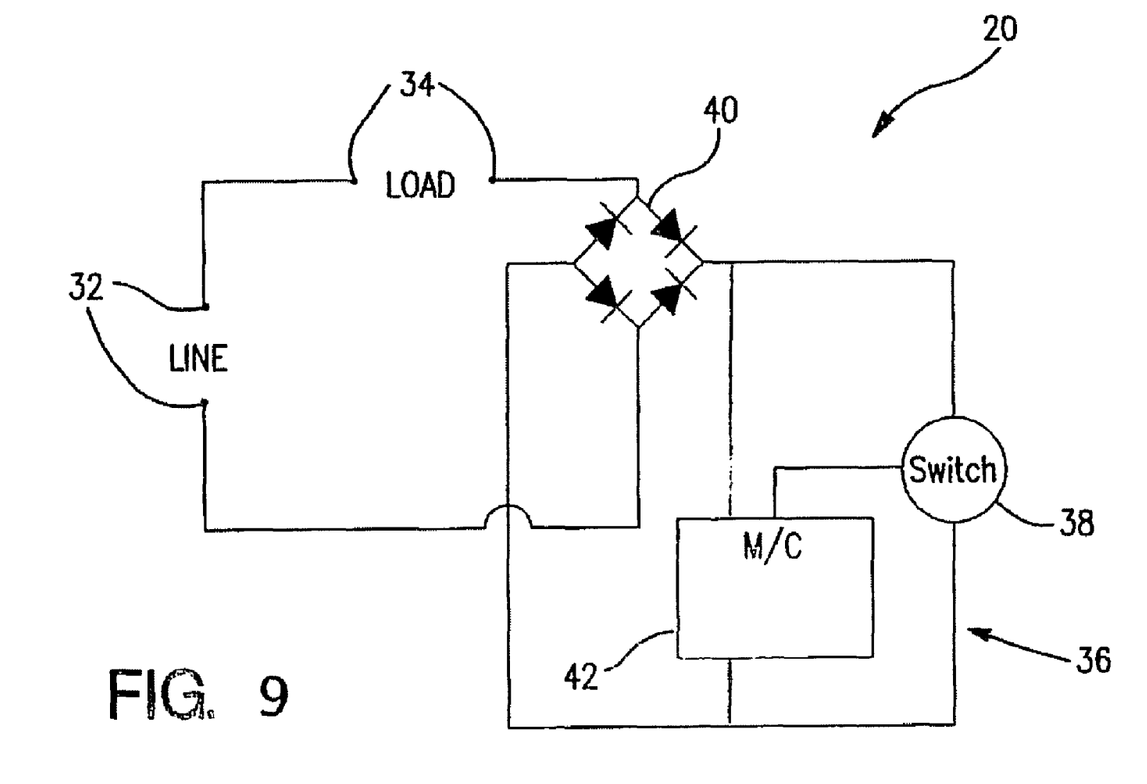
FIG. 9 is a schematic circuit diagram showing an embodiment of the power controller of the present invention.

With reference to FIG. 9 that illustrates an embodiment of the present invention, the voltage conversion circuit 20 includes line terminals 32 for a line voltage and load terminals 34 for a load voltage, a phase-clipping circuit 36 that is connected to the line and load terminals and establishes a phase conduction angle that determines the RMS load voltage. The circuit 36 includes a transistor switch 38, a full-wave bridge 40, and a microcontroller 42 that sends signals to a gate of the transistor switch 38 that cause the transistor switch to be ON during times periods that define the phase conduction angle for the circuit 36. The microcontroller 42 is arranged and adapted to sense the load voltage and to compare the sensed load voltage to a reference RMS voltage and to adjust the ON/OFF periods of the transistor switch 38 in response to the comparison to cause the load voltage to approach the reference RMS voltage.

Conventional RC phase-control clipping circuits are very sensitive to fluctuations in the line voltage magnitude. The present invention provides a power controller that makes adjustments in response to changes in the line voltage magnitude by changing the ON periods of the transistor switch that triggers conduction in response to sensed changes, thereby reducing variation of the RMS load voltage compared to conventional RC phase-control circuits. Additionally, this control technique makes it possible to use a forward/reverse hybrid of phase-control clipping by which the effects of electromagnetic interference (EMI) and total harmonic distortion (THD) are reduced in comparison to forward-only phase-control clipping.

Microcontroller 42 preferably includes an analog-to-digital converter (ADC) that converts the load voltage to a digital signal, a comparator that compares the output from the ADC to the reference RMS voltage (or a corresponding reference value), and a program (e.g., in a hardwired and/or programmable circuit) that adjusts the ON time of the transistor switch to adjust the RMS load voltage based on an output from the comparator so as to approach the reference RMS voltage. The ADC is connected to the load voltage through a current limiting resistor. The microcontroller samples the load voltage waveform applied to the lamp and automatically increases or decreases the conduction times such that the RMS load voltage is nearly always at a desired level. The reference RMS voltage is preset to a value that provides the desired RMS load voltage for the lamp. The structure and operation of microcontroller 42 need not be described in detail as such microcontrollers are known in the art and are commercially available from various sources, including Microchip Technology, Inc. under the PIC trademark (e.g., a PIC™ 8-pin 8-bit CMOS microcontroller, such as PIC12F683).

Figure 10:
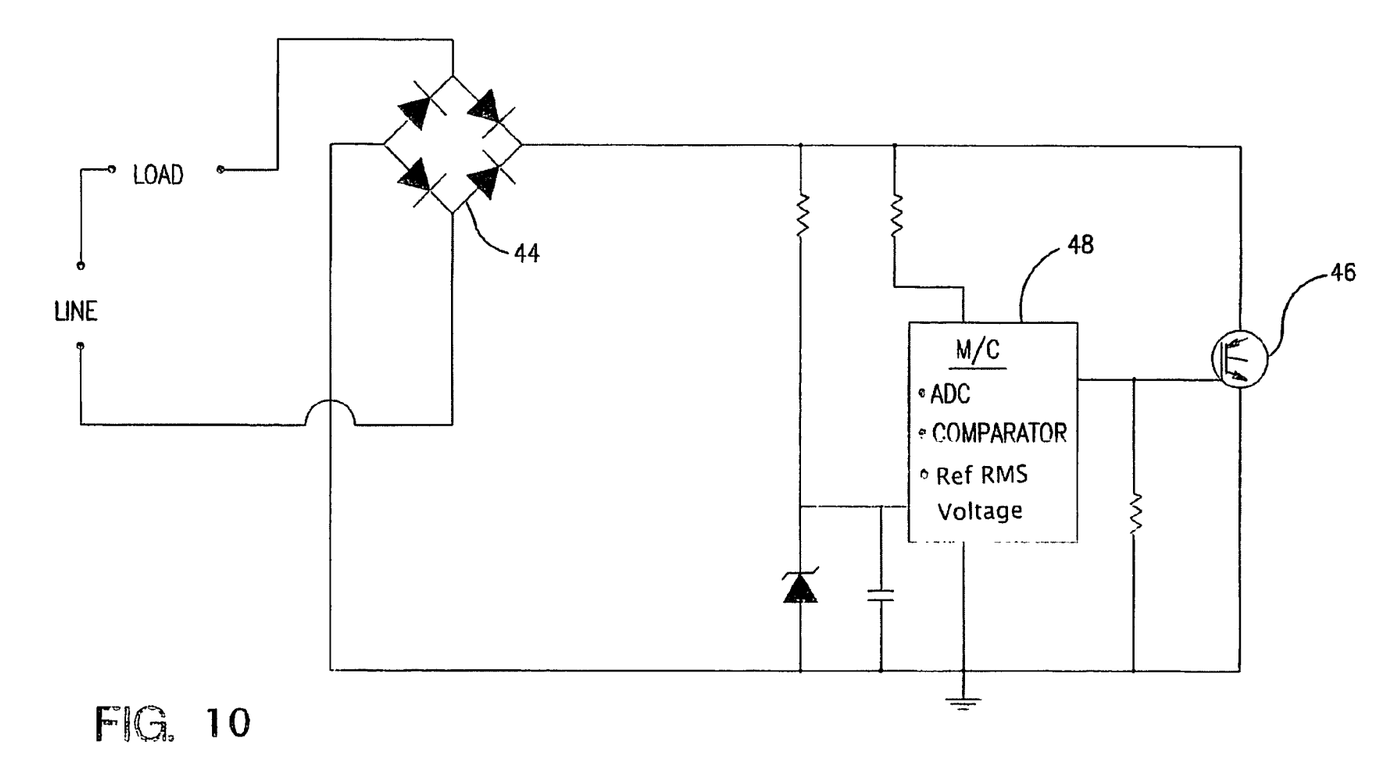
FIG. 10 is a circuit diagram of a more particular embodiment of the present invention.

With reference now to FIG. 10, a particular embodiment of the present invention includes a full-wave bridge 44, an insulated gate bipolar transistor 46 (which alternatively may be a MOSFET), and a programmable microcontroller 48 (e.g., a PIC™ microcontroller) that includes an analog-to-digital converter. The microcontroller 48 monitors the voltage on the output line and automatically adjusts the duty cycle of the transistor switch such that the RMS load voltage supplied to the lamp filament is constantly at the desired level. Inputs to the microcontroller 48 may be provided by including appropriate circuitry such as the connections, resistors and capacitors in FIG. 10, which are shown by way of example. A heat sink (not shown) may be attached to the transistor switch as needed.

Figure 11:
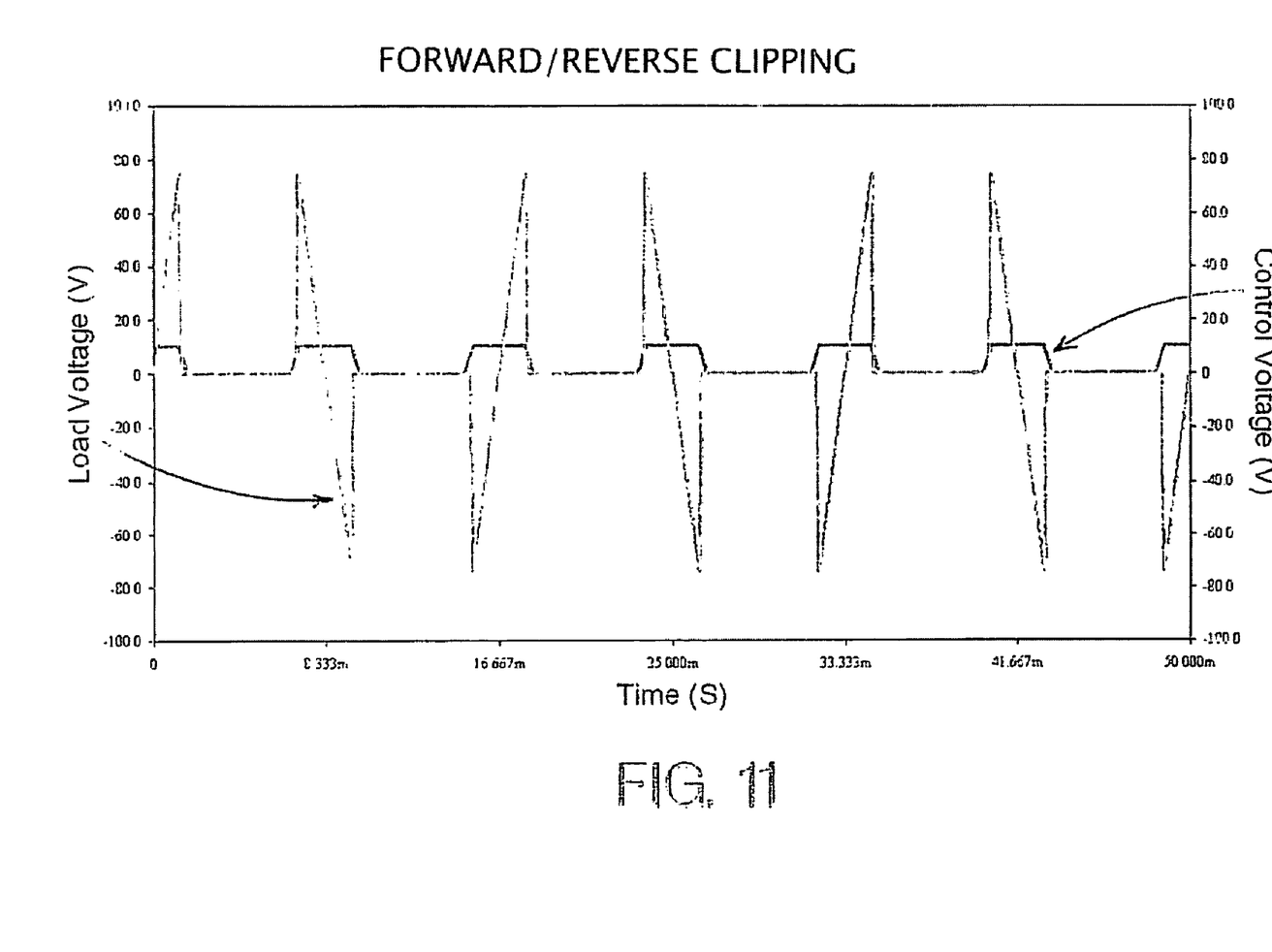
FIG. 11 is a graph depicting forward/reverse hybrid clipping of the present invention, including the clipped load voltage and the control voltage from the microcontroller.

The phase-clipping circuit may be used for reverse, forward, or forward/reverse hybrid phase clipping. With reference to FIG. 11, the microcontroller may control the transistor switch to provide forward/reverse hybrid phase clipping that removes power from the region of the load voltage cycle near the peak of the cycle between polarity changes, without clipping the leading and trailing edges. The signals should have a positive polarity at the gate of the transistor switch to provide the hybrid clipping.

Figure 12:
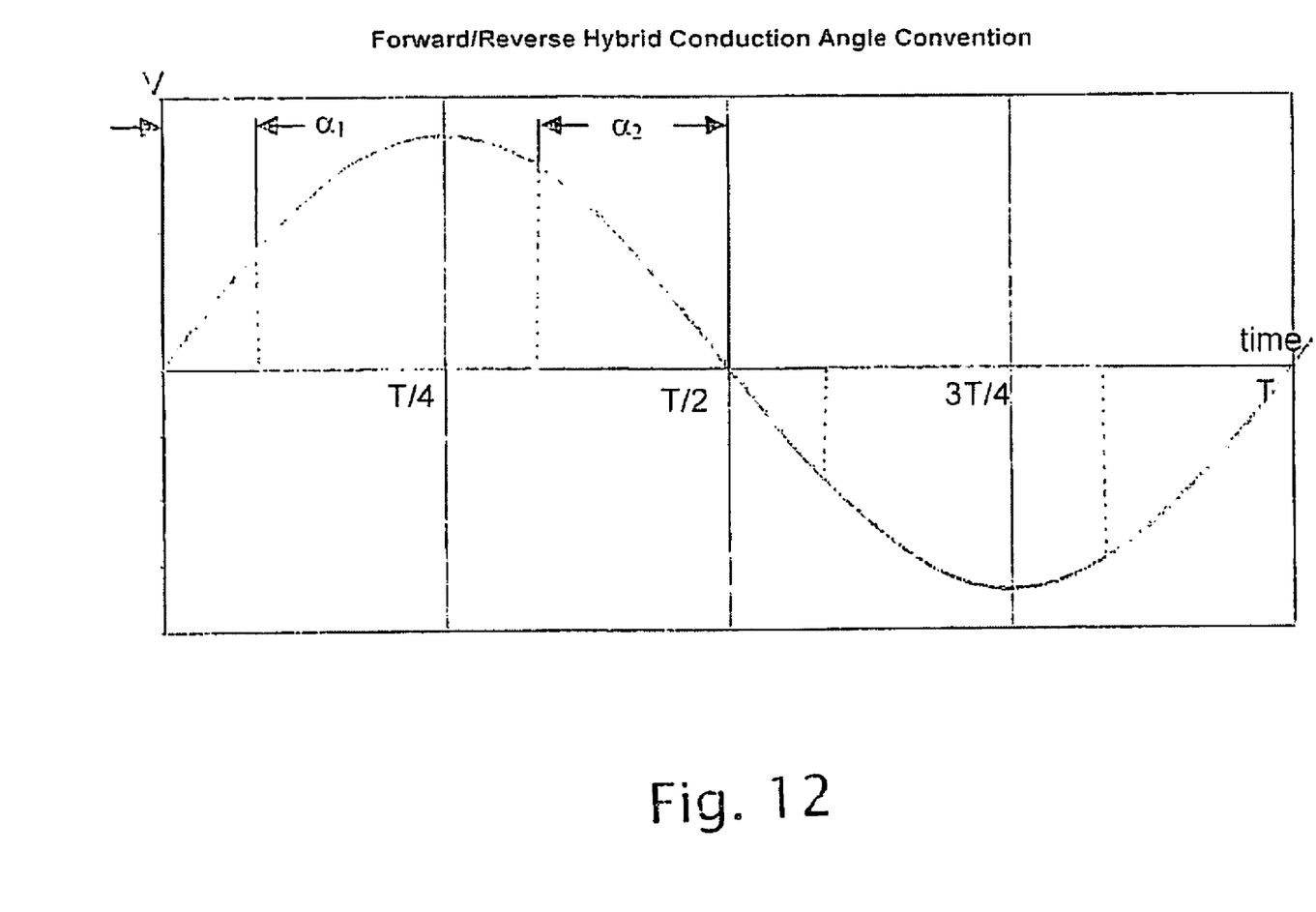
FIG. 12 is a graph depicting the conduction angle convention for forward/reverse hybrid clipping.

With reference to FIG. 12, the forward/reverse hybrid phase clipping is defined as clipping that removes power from the region of the load voltage cycle near the peak of the cycle between polarity changes, without clipping the leading and trailing edges. That is, clipping occurs in the region shown in FIG. 12 between the conduction angle $\alpha_1$ and the conduction angle $\alpha_2$. As is apparent, together the two conduction angles $\alpha_1$ and $\alpha_2$ form a conduction region that spans a polarity change of the load voltage. The signals from the microcontroller to the transistor switch are timed to provide this hybrid clipping.

Figure 13:
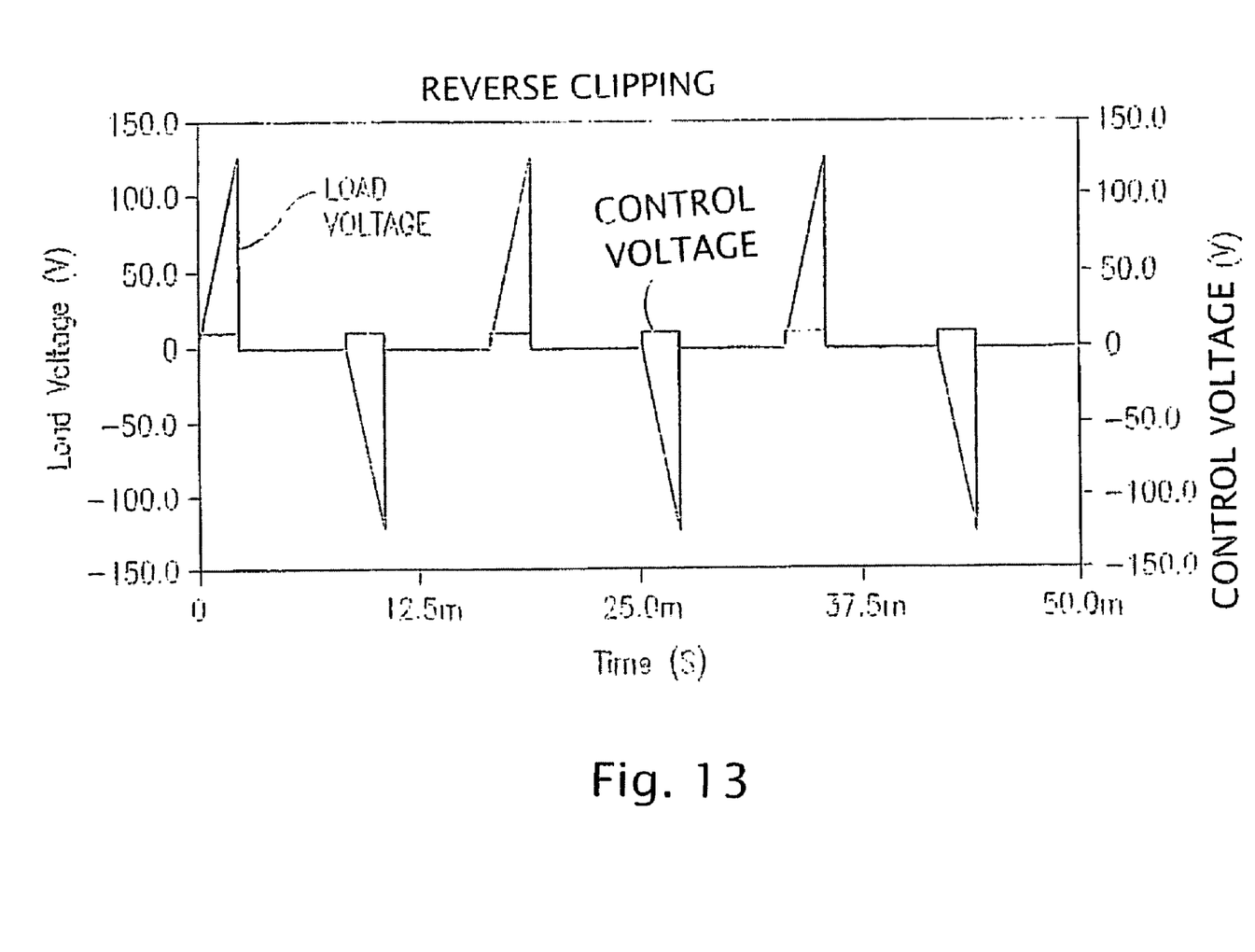
FIG. 13 is a graph depicting reverse clipping of the present invention, including the clipped load voltage and the control voltage from the microcontroller.
Figure 14:
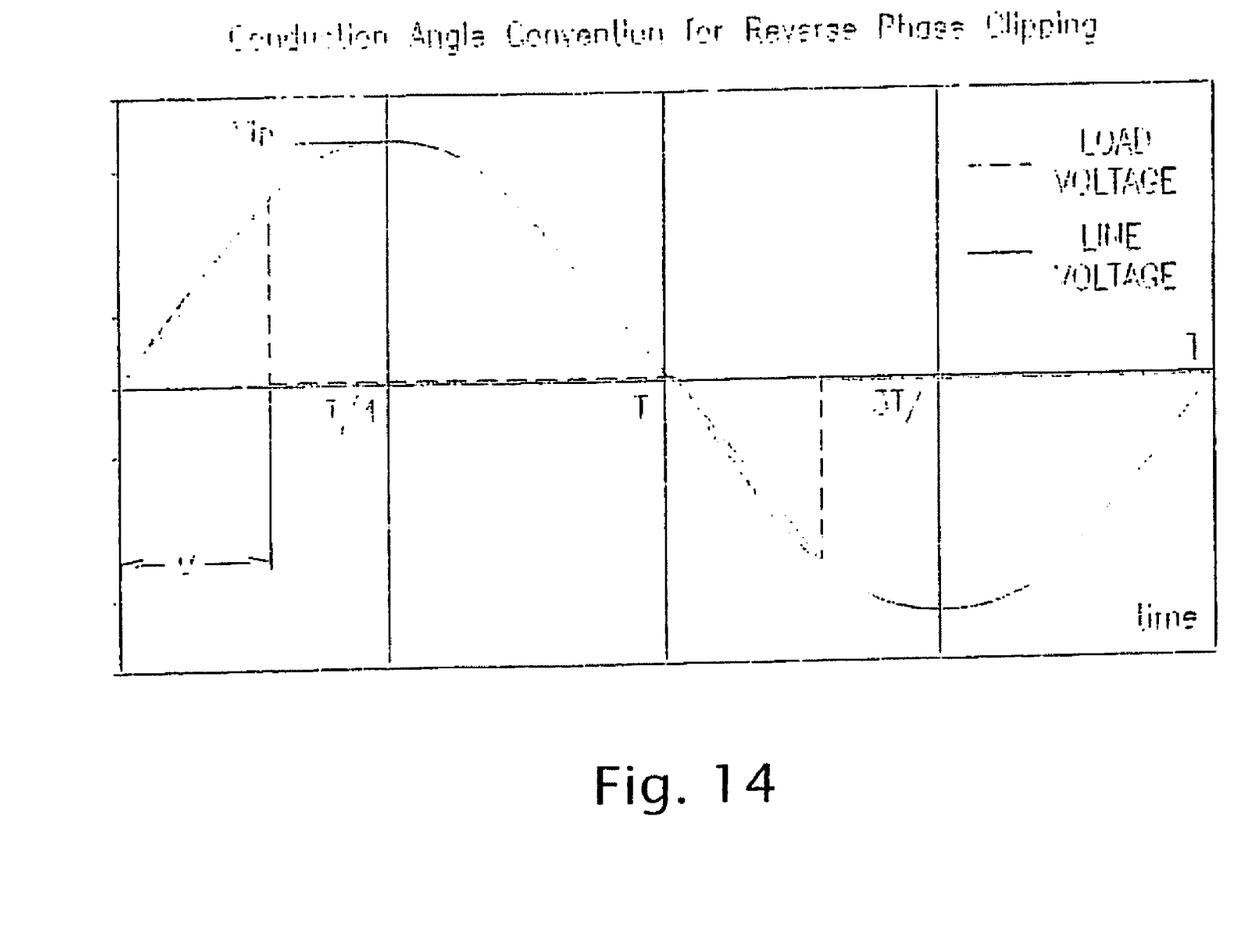
FIG. 14 is a graph depicting the conduction angle convention for reverse clipping.

Alternatively and with reference to FIG. 13, the microcontroller may control the transistor switch to provide reverse phase clipping that removes power from the region of the load cycle from near the peak until the next polarity change. The conduction angle convention for reverse clipping is shown in FIG. 14 wherein the conduction angle $\alpha$ is shown in the region of the load cycle immediately following a polarity change.

Similarly, the microcontroller may be used to control the transistor switch to provide forward phase clipping that removes power from the region of the load cycle from a polarity change and through a peak load voltage. The conduction angle convention for reverse clipping is shown in FIG. 6 wherein the conduction angle $\alpha$ is shown in the region of the load cycle immediately before a polarity change.

While embodiments of the present invention have been described in the foregoing specification and drawings, it is to be understood that the present invention is defined by the following claims when read in light of the specification and drawings.

We claim:

1. A phase-control power controller that converts a line voltage to a RMS load voltage, the controller comprising:

line terminals for a line voltage and load terminals for a load voltage; and a phase-clipping circuit connected to said line and load terminals and establishing a phase conduction angle that determines an RMS load voltage, said phase-clipping circuit comprising a transistor switch and a microcontroller that operates said transistor switch, wherein ON/OFF periods of said transistor switch define the phase conduction angle, said microcontroller being arranged and adapted to sense the load voltage and to compare the sensed load voltage to a reference RMS voltage and to adjust the ON/OFF periods of said transistor switch in response to the comparison to cause the load voltage to approach the reference RMS voltage.

2. The controller of claim 1, wherein said microcontroller causes said transistor switch to be ON immediately before and after a polarity change of the load voltage and OFF when the load voltage is at a peak between adjacent polarity changes.

3. The controller of claim 1, wherein said microcontroller causes said transistor switch to be ON immediately following a polarity change of the load voltage and OFF when the load voltage is at a peak and until the next polarity change.

4. The controller of claim 1, wherein said microcontroller causes said transistor switch to be OFF immediately following a polarity change of the load voltage and through a peak load voltage and then ON until the next polarity change.

5. The controller of claim 1, wherein said phase-control circuit comprises a full-wave bridge.

6. The controller of claim 1, wherein said microcontroller comprises an analog-to-digital converter that converts a waveform of the sensed load voltage to a digital signal.

7. The controller of claim 1, wherein said microcontroller is arranged and adapted to provide a positive polarity signal to a gate of said transistor switch when said transistor switch is ON.

8. The controller of claim 1 in an integrated circuit that is connected between a terminal of a lamp and a light emitting element of said lamp.

* * * * *